(12) United States Patent
Fedtke et al.

(10) Patent No.: US 11,451,017 B2
(45) Date of Patent: Sep. 20, 2022

(54) SWITCHGEAR CABINET

(71) Applicant: Siemens Energy Global GmbH & Co. KG, Munich (DE)

(72) Inventors: Tom Fedtke, Berlin (DE); Tommy Haberer, Berlin (DE); Arno Wahle, Falkensee (DE); Alexander Rose-Poetzsch, Panketal (DE); Christian Bradler, Falkensee (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/050,922

(22) PCT Filed: Apr. 9, 2019

(86) PCT No.: PCT/EP2019/058902
§ 371 (c)(1),
(2) Date: Oct. 27, 2020

(87) PCT Pub. No.: WO2019/206617
PCT Pub. Date: Oct. 31, 2019

(65) Prior Publication Data
US 2021/0242669 A1   Aug. 5, 2021

(30) Foreign Application Priority Data

Apr. 27, 2018 (DE) .............. 102018206577

(51) Int. Cl.
*H02B 13/025* (2006.01)
*H02B 13/045* (2006.01)

(52) U.S. Cl.
CPC ......... *H02B 13/025* (2013.01); *H02B 13/045* (2013.01)

(58) Field of Classification Search
CPC ... H02B 13/025; H02B 13/045; H02B 13/065
See application file for complete search history.

(56) References Cited

U.S. PATENT DOCUMENTS

| | | | | |
|---|---|---|---|---|
| 3,238,703 A * | 3/1966 | Lopez | ................... | B01D 63/087 210/231 |
| 5,710,402 A * | 1/1998 | Karnbach | .............. | H02B 1/565 218/157 |
| 6,827,643 B2 * | 12/2004 | Eiselt | ....................... | H02B 1/56 174/17 VA |
| 7,625,417 B2 * | 12/2009 | Yang | .................... | B01D 46/521 55/501 |
| 9,472,925 B2 * | 10/2016 | Zende | .................. | H02B 13/025 |
| 2008/0097254 A1 | 4/2008 | Torres et al. | | |

(Continued)

FOREIGN PATENT DOCUMENTS

| | | |
|---|---|---|
| CN | 101682178 A | 3/2010 |
| CN | 201904564 U | 7/2011 |
| CN | 203377498 U | 1/2014 |

(Continued)

*Primary Examiner* — Robert J Hoffberg
(74) *Attorney, Agent, or Firm* — Laurence A. Greenberg; Werner H. Sterner; Ralph E. Locher (57) ABSTRACT

A switchgear cabinet is equipped with a pressure relief channel for discharging a fluid stream. A diffuser is arranged in the pressure relief channel. The diffuser has a mechanically stabilizing base plate with multiple first openings, which are covered by a meshwork with multiple second openings.

7 Claims, 4 Drawing Sheets

(56) References Cited

U.S. PATENT DOCUMENTS

| | | |
|---|---|---|
| 2013/0327623 A1 | 12/2013 | Kozuru et al. |
| 2019/0045644 A1 * | 2/2019 | Ren .................. H05K 5/0213 |

FOREIGN PATENT DOCUMENTS

| | | | |
|---|---|---|---|
| CN | 204760864 U | 11/2015 | |
| CN | 105826854 A | 8/2016 | |
| CN | 205753153 U | 11/2016 | |
| CN | 205882422 U | 1/2017 | |
| CN | 107086484 A | 8/2017 | |
| CN | 206498130 U | 9/2017 | |
| CN | 107910790 A * | 4/2018 | |
| CN | 109004570 A * | 12/2018 | |
| CN | 112350205 A * | 2/2021 | |
| DE | 2330163 A1 * | 1/1975 | ........... H02B 13/025 |
| DE | 7508952 U | 7/1975 | |
| DE | 7731384 U1 | 2/1978 | |
| DE | 8108217 U1 | 6/1983 | |
| DE | 8312297 U1 | 10/1983 | |
| DE | 3436108 C2 * | 8/1989 | ........... H02B 13/025 |
| DE | 29509361 U1 | 8/1995 | |
| DE | 4141685 C2 | 7/1996 | |
| DE | 29611396 U1 | 7/1997 | |
| DE | 10313723 B3 | 6/2004 | |
| DE | 19817526 B4 * | 5/2005 | ........... H02B 13/025 |
| DE | 102014116473 A1 | 5/2016 | |
| DE | 102015206355 A1 | 10/2016 | |
| EP | 0666627 A1 * | 8/1995 | ............. F28F 13/12 |
| EP | 0903826 A1 | 3/1999 | |
| EP | 1059715 A1 | 12/2000 | |
| JP | H08168117 A | 6/1996 | |
| JP | H10178706 A | 6/1998 | |
| JP | 2012196044 A | 10/2012 | |
| JP | 6143990 B1 | 6/2017 | |
| WO | WO-2017151479 A1 * | 9/2017 | ......... H05K 7/20909 |

* cited by examiner

SWITCHGEAR CABINET

BACKGROUND OF THE INVENTION

Field of the Invention

The invention relates to a switchgear cabinet having a pressure relief channel for discharging a fluid stream and having a diffuser which is arranged in the pressure relief channel.

A switchgear cabinet is known for example from the translation of the European patent specification DE 600 03 758 T2. The switchgear cabinet there has a pressure relief channel along the course of which a diffuser is arranged. The known diffuser is pivotably arranged such that, in the case of an increased occurrence of fluid flow, an enlarged cross section for rapid outflow of the fluid stream is available. A disadvantage is that, if the diffuser is pivoted outward, the effect of the diffuser, specifically diffusion of a fluid stream, is no longer provided. However, in particular in the case of large amounts of fluid flow occurring, diffusion is desired.

SUMMARY OF THE INVENTION

It is therefore an object of the invention to specify a switchgear cabinet whose diffuser is effective even for large fluid flows.

According to the invention, the object is achieved, in the case of a switchgear cabinet of the type mentioned in the introduction, in that the diffuser has a mechanically stabilizing base plate having multiple first openings which are covered by a meshwork having multiple second openings.

A switchgear cabinet is used in electrical energy transmission and distribution apparatuses in order to accommodate electrical devices and to protect the latter from external access. Arranged as such in a switchgear cabinet are for example electrical lines and cables, measurement and control equipment, contactors, relays, etc. Here, a switchgear cabinet surrounds a space which serves as a so-called electrical compartment for accommodating the electrical devices to be enclosed. The switchgear cabinet may as such hermetically enclose the electrical compartment. In this case, the interior (electrical compartment) is completely hermetically sealed with respect to the surroundings of the switchgear cabinet. In this case, reference is made to encapsulation, an encapsulation housing, etc. Under operating conditions, the interior of a hermetically sealed switchgear cabinet can already have a positive pressure. Generally, switchgear cabinets serve for contact protection, so that a throughflow of fluids into the interior of the switchgear cabinet or from the interior of the switchgear cabinet is possible to a limited extent. Independently of this, it is possible for large fluid volumes to arise briefly in the interior of the switchgear cabinet, which fluid volumes have to be discharged to avoid damage to the switchgear cabinet. As such, a pressure relief device, which generally serves for opening up a pressure relief opening (outflow opening), is normally arranged in a wall of the switchgear cabinet. For example, bursting plates, flaps, valves or other elements which are controlled in particular in a manner dependent on differential pressure may be parts of a pressure relief device. According to the configuration of the switchgear cabinet, a pressure relief device can bring about hermetic closure or non-hermetic blocking.

A pressure relief channel serves for conducting the fluid stream to a pressure relief device or possibly directly to a pressure relief opening, for example an opening which is protected from direct access merely by a coarse-mesh grating, so that a fluid stream which is to be conducted out via the pressure relief channel can be released into the surroundings of the switchgear cabinet. In the case of a hermetically sealed switchgear cabinet, the pressure relief channel is likewise to be closed off hermetically. Opening-up of the pressure relief channel can be controlled by a pressure relief device. The pressure relief channel is therefore a channel in which a flowing fluid is conducted and directed. A pressure relief channel may be formed for example by parts of the electrical compartment of the switchgear cabinet. For example, a pressure relief channel may extend in the electrical compartment above electrical devices or electrical devices may also be arranged directly in the pressure relief channel so as to achieve particularly effective removal of flowing fluids from the electrical devices.

A fluid stream may be produced for example as a result of an electrical fault in the interior of the switchgear cabinet, in particular in the electrical compartment. An electrical fault is for example failure of an electrical insulation, whereby electric arc phenomena can occur. For example, short circuits or ground faults can occur at cables or lines as a result of excess voltages or aging of insulation material. The amounts of energy released here occur within short time intervals, whereby an expansion of fluids situated in the switchgear cabinet, such as for example insulating gases, for example atmospheric air, can also occur. The occurrence of plasma clouds, which arise in the event of insulating materials or conductor materials vaporizing, is furthermore possible. Correspondingly, the fluid stream may be laden with particles, which, just like the fluid under elevated pressure, are to be discharged from the interior of the switchgear cabinet into non-critical regions of the surroundings of the switchgear cabinet. For this purpose, use is made of the pressure relief channel, which ultimately delivers the fluid stream into the surroundings of the switchgear cabinet through a pressure relief opening.

By means of a diffuser, it is possible to even out the generation of fluid to be discharged, which generally occurs in a small zone in a punctiform manner, to cool the fluid, to disperse the fluid, etc., and in this way to limit the damage which can be caused by the fluid flow. By means of the fluid flow, slowing and cooling of particles contained in the fluid stream are thus furthermore also made possible. The use of a mechanically stabilizing base plate having multiple first openings at a diffuser provides a structure which is also able to resist pressure influences which arise in an abrupt manner. The openings are suitable here for cooling and for distributing the fluid stream, and for allowing said fluid stream to pass through a multiplicity of first openings. The mechanically stabilizing base plate may be formed for example from mutually crossing strips/struts, etc. such that an angularly rigid, substantially planar base plate is formed. For example, multiple strips may be interwoven, riveted together, welded together, etc. According to angular position and strip width, different cross sections may be realized for the openings, for example the first openings may be of rectangular, square or rhomboidal form. The base plate may be joined together from multiple parts to form an angularly rigid composite. Here, the base plate may be provided for supporting the diffuser mechanically on walls of the pressure relief channel or of the switchgear cabinet, for example the base plate may extend substantially transversely to the pressure relief channel, wherein the base plate, in the installed state, spans the cross section of the pressure relief channel, so that the diffuser provides, in the manner of a diaphragm, a barrier between the wall surfaces which delimit the pressure relief channel. In a preferred variant, the first openings may be circular openings which are arranged distributed over lines, wherein, on adjacent lines, the first openings are offset from one another. Owing to the zigzag-like jumps, established in this way, along the course of the webs between the first openings, the cooling effect and the dispersion effect of the webs of the base plate are particularly effective. Here, it may be provided that the base plate is connected to walls for example by screwing. For this purpose, the base plate may have for example angled tabs which are provided with corresponding cutouts for the fastening of the diffuser. The tabs may in this case be oriented substantially parallel in the direction of the fluid stream to be conducted through the diffuser, so that the cutouts (for example for screws, bolts, rivets) extend substantially transversely to the direction of passage.

Stabilization of the diffuser by means of the base plate makes it possible for a meshwork to be mounted over the first openings, wherein the meshwork has second openings. Here, the size ratio of the first openings and second openings is advantageously selected in such a manner that the second openings of the meshwork have a smaller cross section than the first openings. Preferably, the cross sections of a first opening and a second opening may additionally differ in terms of their shape. Preferably, a first opening may be spanned by multiple second openings. Advantageously, the second openings are formed by so-called expanded metal, that is to say, by punching and drawing of individual webs of a plate, a meshwork having a for example rhomboidal structure is formed, which meshwork has webs, situated so as to be tilted with respect to one another, between the individual second openings of the meshwork. Thus, owing to the production method, there are formed angular webs, which make possible particularly efficient swirling and cooling in particular by way of a corresponding surface enlargement at the meshwork of the diffuser. Advantageously, the meshwork and the base plate are oriented substantially parallel to one another, so that the second openings of the meshwork are situated in front of the first openings. The second openings may preferably be arranged spaced apart from the first openings. This allows the cooling, directing and swirling effect of the diffuser to be additionally intensified. The first openings may serve for swirling the fluid stream, while the second openings, with the meshwork, bring about additional cooling of the fluid stream. The meshwork is in this case stabilized and supported at least partially from the base plate or by the base plate.

An advantageous configuration may provide that the second openings are situated in front of the first openings in the direction of passage of the diffuser.

The diffuser may be subjected to a fluid stream, wherein the fluid stream is conducted through the pressure relief channel in the direction of a pressure relief opening. Said fluid stream in the direction of the pressure relief opening corresponds to the direction of passage of the diffuser. If the diffuser is subjected to flow by the fluid stream, firstly the second openings and then the first openings are passed through by the fluid stream. Thus, cooling of the fluid stream is brought about already at the first openings. In addition, this arrangement has the advantage that particles, contained for example in the fluid stream, are more likely to collide with the walls of the meshwork and bring about cooling or slowing of the particles.

A further advantageous configuration may provide that the meshwork is embossed so as to delimit at least one cavity over the base plate.

The meshwork is preferably arranged spaced apart from the stabilizing base plate at least sectionally. In this way, a calming zone is formed between the second openings and the first openings with passing-through of a fluid stream, within which calming zone the intensity of swirled fluid is reduced in order to then be subjected to renewed swirling of an alternative form in a subsequent opening. The second openings are, by way of an embossment of the meshwork, that is to say over the surface of the base plate, at least partially spaced apart and oriented with different distances from the base plate, it being possible, according to the formation of the cavity, for an additional profiling of the intensity-reducing space between the base plate and the meshwork to be realized. For example, the meshwork may be embossed so as to be dome-shaped, trapezoidal, beaded, folded in a right-angled manner, trough-like or undulating, whereby, over the base plate, differently acting swirling occurs with a fluid stream passing through the second openings. For example, a strip-shaped, undulating embossment of the meshwork may be provided. In this case, the cavity extends between the base plate and the in each case spanning section of the meshwork.

The meshwork may for example be of intrinsically stable form, so that this may also be mounted in an intrinsically stable manner by way of deformation.

It may advantageously be provided that the embossment is a sawtooth embossment.

A sawtooth embossment results in a multiplicity of zones in the meshwork that are tilted with respect to the base plate being produced in the meshwork. Here, the sawtooth results in the mounting of a lectern-like embossment which is distributed in an alternately repeating manner over the base plate. In particular as a result of the lectern-like tilting of individual surfaces of the meshwork, the passing of a fluid stream through the diffuser is thus additionally influenced. According to the arrangement of the diffuser, titled zones may be impinged on differently by the fluid stream. The sawtooth embossment may be of symmetrical (zigzagged) or asymmetrical (titled) design.

A further advantageous configuration may provide that a first group of second openings is arranged substantially transversely, and a second group of second openings is arranged substantially parallel, in the direction of passage of the diffuser.

The second openings of the meshwork may be arranged in different angular positions with respect to the direction of passage of the fluid stream. In particular in the case of a repeating profiling (for example sawtooth profile) of the meshwork of the diffuser, it is consequently possible for a first group and a second group of openings to be formed, wherein the first group is arranged substantially transversely, and the second group is arranged substantially parallel, in the direction of passage of the diffuser. The first group of second openings can be passed through relatively easily by a fluid stream with limited swirling, whereas the second group of second openings, owing to the parallel orientation thereof, brings about a more intense swirling of the fluid stream. The use of an expanded material for the meshwork can thus particularly result in swirling or a transverse component becoming a feature of the fluid stream through the second group of second openings.

In particular with the use of a sawtooth embossment or a lectern-like arrangement of individual sections of the meshwork, it is consequently possible for different flows through the openings to be realized.

A further advantageous configuration may provide that the base plate is arranged substantially inclined to the direction of passage.

The base plate or else the entire diffuser may be oriented substantially inclined to the direction of passage of the fluid stream. This allows, in particular in the case of a profiling of the meshwork, for a different impingement or throughflow for different groups of second openings to be realized. Thus, in particular in the case of a sawtooth-like profiling of the meshwork or in the case of a lectern-like tilting of the meshwork, it is possible for there to be formed different groups of the second openings, which are oriented differently with respect to the direction of passage. Furthermore, an inclined arrangement allows those surfaces at the diffuser which are provided for influencing the fluid stream to be enlarged within a pressure relief channel.

A further advantageous configuration may provide that the diffuser is arranged in a diverting knee so as to assist a change in direction of the fluid stream.

It is necessary to allow the pressure relief channel to run differently according to the spatial conditions. In a simple case, the pressure relief channel (outflow channel) may run substantially linearly. According to requirement, it is however necessary to provide a change in direction along the course of the pressure relief channel. Such a change in direction of the fluid stream may be brought about by a diverting knee of the pressure relief channel. If then one or more diffusers are arranged within the diverting knee, it is possible by way of swirling of the fluid stream that is to be realized on the one hand for the swirled fluid stream to be forced into the preferred outflow direction of the diverting knee too. By means of a diverting knee, it is, for example, possible for a change in direction by 90°, 45°, etc. to be produced.

A further advantageous configuration may provide that at least one diffuser is arranged in a section of a pressure relief channel that is attached in the manner of an oriel to a switchgear cabinet.

A pressure relief channel is preferably to be constructed to be modular, that is to say the required profile of the pressure relief channel is able to be assembled from multiple base elements. Here, it may advantageously be provided that a section is attached in the manner of an oriel to a wall of the switchgear cabinet, wherein at least one diffuser is arranged within the section. It is thereby possible for example to make provision for the use of cuboidal base elements on whose shell surface a protuberance is provided by the section in the form of an oriel. The oriel may, for example, also serve for providing a pressure relief opening. This allows a path extension to be realized along the course of the pressure relief channel.

A further advantageous configuration may provide that a pressure relief opening of the pressure relief channel directs the fluid stream into a vertical direction.

Advantageously, the fluid stream is blown out in a vertical direction, and so particles are not expelled into the directly adjacent regions of the switchgear cabinet. Here, it may be provided that the pressure relief opening is closed off (hermetically/non-hermetically) for example by a pressure relief device. After the fluid stream has exited the pressure relief opening, this can unfold freely.

According to requirement, it is also possible for an arrangement of multiple diffusers to be provided along the course of the pressure relief channel such that a cascade of diffusers is formed. Here, it may be provided that the diffusers have an identical structure. It may however also be provided that the diffusers have the same type of structure but vary in terms of the selection of the meshwork and the base plate and the first and second openings arranged there.

In the following, an exemplary embodiment of the invention is schematically shown in a drawing and described in more detail below.

DETAILED DESCRIPTION OF THE INVENTION

Figure 1:
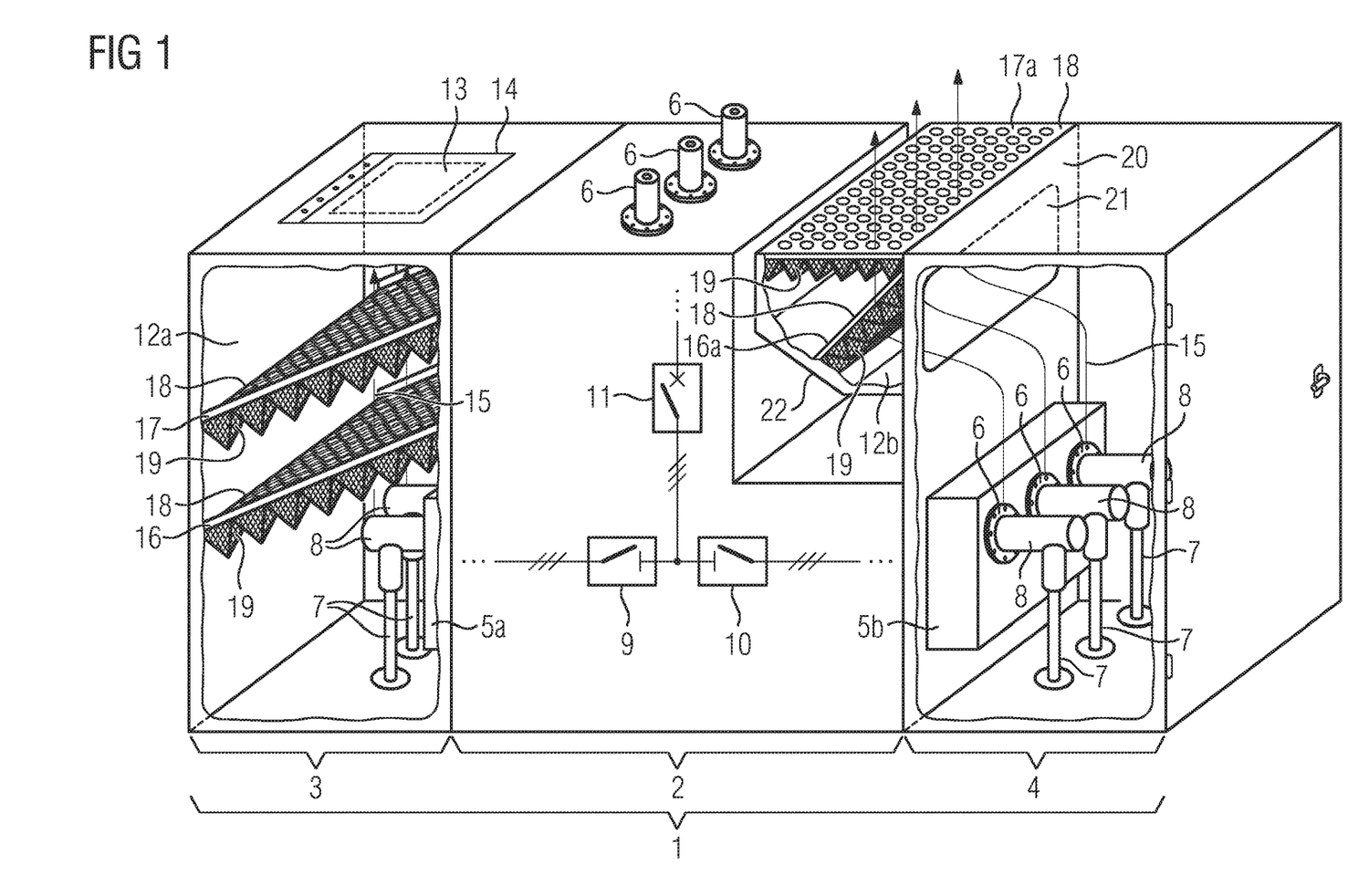
FIG. 1 shows a perspective view of an electrical energy transmission device partially cut away.

FIG. 1 shows an electrical energy transmission device with a gas-insulated switchgear panel unit 1. The gas-insulated switchgear panel unit 1 is equipped with an encapsulation housing 2. The encapsulation housing 2 forms a fluid-tight barrier around an interior space of the switchgear panel unit 1. The interior space (electrical compartment) can be filled with an electrically insulating gas at positive pressure since volatilization of the electrically insulating fluid is prevented by the hermetically sealing encapsulation housing 2. Here, the encapsulation housing 2 is formed substantially from electrically conductive materials, wherein lead-throughs (cf. further embodiments) for introduction of phase conductors pass through walls of the encapsulation housing 2 of the switchgear panel unit 1. The interior of the encapsulation housing 2 is filled with phase conductors and switching devices, which are electrically insulated by an electrically insulating gas, which is hermetically sealed in the interior of the encapsulation housing 2 and is possibly at positive pressure. In this way, the encapsulation housing 2 forms a hermetically closed switchgear cabinet.

Arranged on two sides of the encapsulation housing 2 that are oriented opposite one another are a first switchgear cabinet 3 and a second switchgear cabinet 4. In the present case, the two switchgear cabinets 3, 4 are designed in such a way that they each delimit an electrical compartment (interior space), within which electrical devices are accommodated. By contrast to the electrical compartment of the encapsulation housing 2, the electrical compartments of the two switchgear cabinets 3, 4 are filled with atmospheric air. Fluid arranged in the interior (electrical compartment) of the switchgear cabinets 3, 4 can communicate with the surroundings via corresponding gaps and openings in the housing. However, it may also be provided that, analogously to the design of the encapsulation housing 2 of the switchgear panel unit 1, a fluid-tight design of the switchgear cabinets 3, 4 is realized. The following embodiments are then to be adapted accordingly. Projecting into the interior of the first switchgear cabinet 3 and of the second switchgear cabinet 4 are in each case connection surfaces 5a, 5b. The connection surfaces 5a, 5b are formed by formations on the encapsulation housing 2. Arranged in the connection surfaces 5a, 5b, are plug connectors 6, which serve as lead-throughs, in order to contact cables 7 by means of cable plugs 8 and to bring the phase conductors of the cables 7 into the interior (electrical compartment) of the encapsulation housing 2. Beside the plug connectors 6 passing through the connection surfaces 5a, 5b within the first and second switchgear cabinets 3, 4, further plug connectors 6 are arranged on the encapsulation housing 2, specifically in a cover surface. In FIG. 1, the further plug connectors 6 in the cover surface are free of cable plugs 8 or cables 7. Via the plug connectors 6 situated in the connection surfaces 5a, 5b, phase conductors of the cables 7 able to be plugged in there are able to be introduced in an electrically insulated manner into the interior of the encapsulation housing 2. An electrically conductive connection between the plug connectors 6 of the two connection surfaces 5a, 5b is provided in the interior of the encapsulation housing 2. In order to make it possible for the electrically conductive connection between the plug connectors 6 of the two connection surfaces 5a, 5b to be broken, a first disconnecting switch 9 and a second disconnecting switch 10 are arranged in the electrically conductive connection between the plug connectors 6 of the two connection surfaces 5a, 5b. By means of the two disconnecting switches 9, 10, the electrically conductive connection can thus be broken and closed. It is consequently possible for the cables 7 connected to the plug connectors 6 of the connection surfaces 5a, 5b to be looped through the encapsulation housing 2 or the switchgear panel unit 1. A stub is arranged at those ends of the two disconnecting switches 9, 10 which face one another. Situated in the stub is a power switch 11 which, for its part, is electrically contacted with the further plug connectors 6 situated in the cover surface of the encapsulation housing 2. Via the further plug connectors 6 in the cover surface of the encapsulation housing 2, a cable can be connected in a manner analogous to that shown for the other plug connectors 6, and so here a stub can be led out of the switchgear panel unit 1. It is thus possible via the switchgear panel unit 1 for a cable to be looped through the encapsulation housing 2, and for a stub to be branched off, in order to connect a load or a feeder to the looped-through cable.

In order, in the event of a fault within the two switchgear cabinets 3, 4 and a possibly associated expansion of fluids, in particular gases, to prevent an undefined destruction of the switchgear cabinets 3, 4, the two switchgear cabinets 3, 4 are each equipped with a pressure relief channel 12a, 12b. The pressure relief channels 12a, 12b in each case communicate with the electrical compartment of the respective switchgear cabinet 3, 4 or are formed by parts of the electrical compartment of the respective switchgear cabinet 3, 4. It is firstly intended to describe the pressure relief concept of the first switchgear cabinet 3.

The first switchgear cabinet 3 has a pressure relief opening 13 (outflow opening) in a cover surface. The pressure relief opening 13 is blocked by a flap 14. The flap 14 bears against the boundary region of the pressure relief opening 13. In the event of a positive pressure in the interior of the first switchgear cabinet 3, a pressure increase occurs and, driven by the pressure increase and the difference in pressure between the interior of the first switchgear cabinet 3 and the exterior of the first switchgear cabinet 3, the flap 14 is opened. For this purpose, the flap 14 may have for example a bending edge. In this case, the flap 14 lifts off from its bearing region on the wall of the first switchgear cabinet 3 and opens up the pressure relief opening 13. A pressure relief channel 12a is arranged between the pressure relief opening 13 and the potential source of a fault, for example a cable 7, a cable plug 8 or a plug connector 6. The pressure relief channel 12a connects a potential fault location (for example cable 7, cable plug 8, plug connector 6) to the surroundings (pressure relief opening 13) and predefines an extraction path for a fluid stream 15. If a hermetically closed switchgear cabinet is used, the pressure relief opening 13 is to be hermetically closed and, in the event of a fault, to be opened.

A first diffuser 16 and a second diffuser 17 are arranged in the pressure relief channel 12a of the first switchgear cabinet 3. Here, the first and second diffusers 16, 17 are oriented substantially transversely to the fluid stream 15 provided, wherein, for the purpose of enlarging the passage surface at the respective diffuser 16, tilting of the two diffusers 16, 17 with respect to the direction of passage of the fluid stream 15 is provided. The diffusers 16, 17 are oriented substantially parallel to one another.

Figure 2:
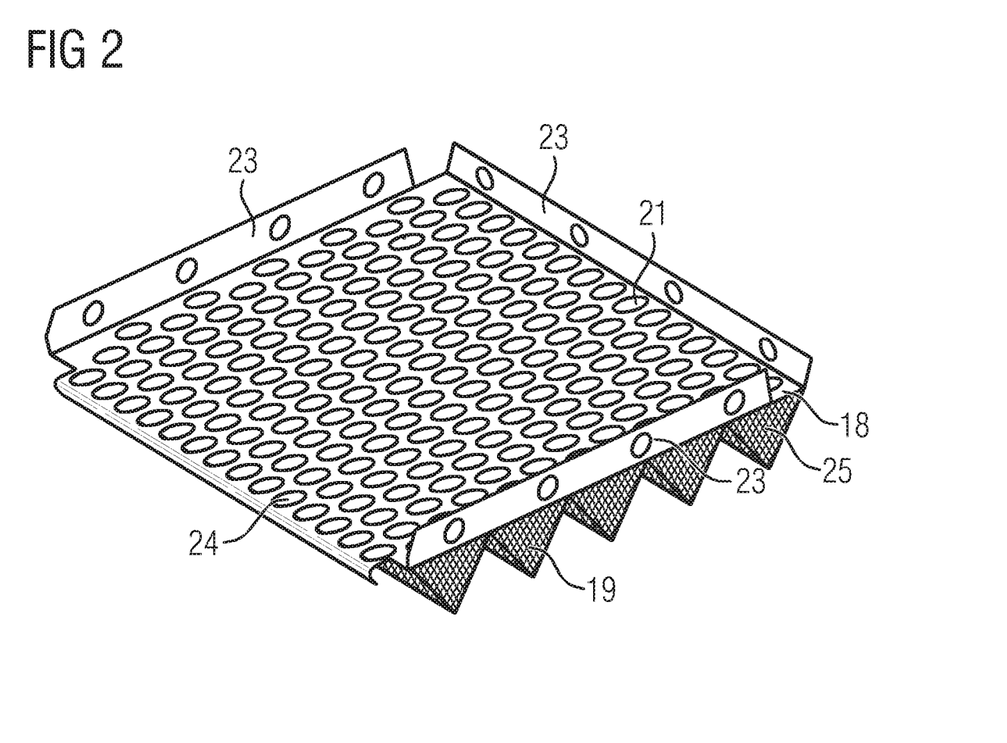
FIG. 2 shows a perspective view of a diffuser.

The diffusers 16, 17 are equipped with a base plate 18, by way of which the diffusers 16, 17 acquire mechanical stability. The base plates 18 are each inserted with their body edges flush into the rectangular cross section of the pressure relief channel 12a of the first switchgear cabinet 3. In each case one meshwork 19 is arranged in each case in front of the base plates 18 of the first and second diffusers 17 in the direction of passage. The meshwork 19 has an embossment, with the result that a cavity is enclosed between the meshwork 19 and the respective base plate 18. The structure of a diffuser 16, 17 is, in FIG. 2, shown in detail and described in more detail.

In the following text, it is now intended to describe the configuration of the pressure relief channel 12b in the second switchgear cabinet 4. The second switchgear cabinet 4 has a substantially planar wall 20, which faces the encapsulation housing 2. The formation with the connection surface 5b projects into the electrical compartment of the second switchgear cabinet 4 through the planar wall 20. A passage opening 21 is formed in the substantially planar wall 20 spaced apart from the cable plugs 8, cables 7 and plug connectors 6 situated at the connection surface 5b. This allows a diverting knee 22 to be positioned on the planar wall 20 on the outside, that is to say facing the encapsulation housing 2. This makes it possible to lengthen the flow path of the pressure relief channel 12b. Within the diverting knee 22, the fluid stream exiting the passage opening 21 is diverted through 90°, with the result that exiting of the pressure relief channel 12b in a vertical direction is made possible. In a manner similar to the arrangement of two diffusers 16, 17 in the first pressure relief channel 12a, a first diffuser 16a and a second diffuser 17a are arranged in the second pressure relief channel 12b. The two diffusers 16a, 17a in the second pressure relief channel 12b are constructed in a manner analogous to the first and second diffusers 16, 17 in the first pressure relief channel 12a. Here, the diffusers 16a, 17a of the second pressure relief channel 12b are arranged in such a way that the second diffuser 17a forms with its base plate 18 a closure (pressure relief opening 13) of the pressure relief channel 12b of the second switchgear cabinet 4. The base plate 18, with corresponding first openings 24, delimits the pressure relief channel 12b of the second switchgear cabinet 4 with respect to the surroundings. The first diffuser 16a of the pressure relief channel 12b of the second switchgear cabinet 4 is arranged along the course of the diverting knee 22 and is oriented substantially transversely, in particular substantially perpendicularly, to the desired diversion of the fluid stream 15 within the diverting knee 22. Consequently, there is preferably created a situation in which both the first diffuser 16a and the second diffuser 17a of the pressure relief channel 12b of the second switchgear cabinet 4 are passed through substantially perpendicularly by the fluid stream 15. In this way, a low-resistance diversion of the fluid stream 15 within the diverting knee 22 is helped by the position of the first and second diffusers 16a, 17a.

The first and second diffusers 16, 16a, 17, 17a, as shown in FIG. 1 in their installation positions, are each of identical design. Only the orientation and position within the respective pressure relief channel 12a, 12b vary. In the following text, it is intended to describe the basic structure of a diffuser 16, 16a, 17, 17a on the basis of FIG. 2. FIG. 2 shows a perspective view of a diffuser 16, 16a, 17, 17a. The diffuser 16, 16a, 17, 17a has a base plate 18. The base plate 18 is of substantially planar form and is provided in the boundary region with folds 23. The angular position of the folds 23 allows an adaptation with regard to the position of the diffuser 16, 16a, 17, 17a within a pressure relief channel 12a, 12b to be predefined. According to bending angle, a more or less pronounced transverse orientation of the substantially planar base plate 18 with respect to a direction of passage of a fluid stream 15 can be realized.

The base plate 18 has a multiplicity of first openings 24. In the present case, the first openings 24 are arranged in multiple parallel rows, wherein, between the first openings 24 of adjacent rows, an offset in the position of the first openings 24 with respect to one another is provided in each case. If use is made of circular cross sections for the first openings 24, as shown in FIG. 2, an offset by approximately half the diameter of the respective first openings 24 is expedient. According to requirement, it may however also be provided that the first openings 24 have different cross-sectional shapes and different cross-sectional areas. For example, the base plate 18 may also be formed by a multiplicity of interconnected strips such that rectangular first openings 24, square, rhomboidal or any other cross sections, etc. are produced.

A meshwork 19 is arranged in front of the base plate 18 in the direction of passage. The meshwork 19 has a multiplicity of second openings 25, wherein the cross section of the second openings 25 is in each case smaller than the cross section of a first opening 24. It is consequently possible for a first opening 24 to be spanned by multiple second openings 25. In this way, cooling and swirling of a fluid flowing through is assisted. In the present case, the meshwork 19 is formed as so-called expanded metal. That is to say, a meshwork 19 is created from a planar plate by punching and drawing, wherein, due to the expansion process, canting of the originally planar sections of the plate is realized. In this way, additional swirling is realized at the edges of the second openings 25. Preferably, the second openings 25 may have rhomboidal cross sections. In order to additionally assist the swirling, the meshwork 19, which is preferably of intrinsically stable design, is provided with an embossment. In the present case, a symmetrical sawtooth embossment is selected, resulting in the formation of a large number of zones which are situated in a lectern-like manner with respect to the base plate 18 and in which the second openings 25 are situated in each case. Consequently, multiple cavities are formed between the base plate 18 and the respective sawteeth of the profiled meshwork 19. The meshwork 19 is connected to the base plate 18 in a punctiform manner. This allows the base plate 18 to stabilize the meshwork 19. The diffuser 16, 16a, 17, 17a shown in FIG. 2 may be varied in terms of its dimensions such that, with an appropriate shape, it forms a barrier along the course of a pressure relief channel 12a, 12b. Beside a variation in size and shape of the first and second openings 24, 25, it is also possible for the profiling of the meshwork 19 and of the cavity spanned or delimited therebelow to be varied. For example, a spherically curved cavity, an undulating cavity, a sinusoidal cavity, etc. may be used.

Figure 3:
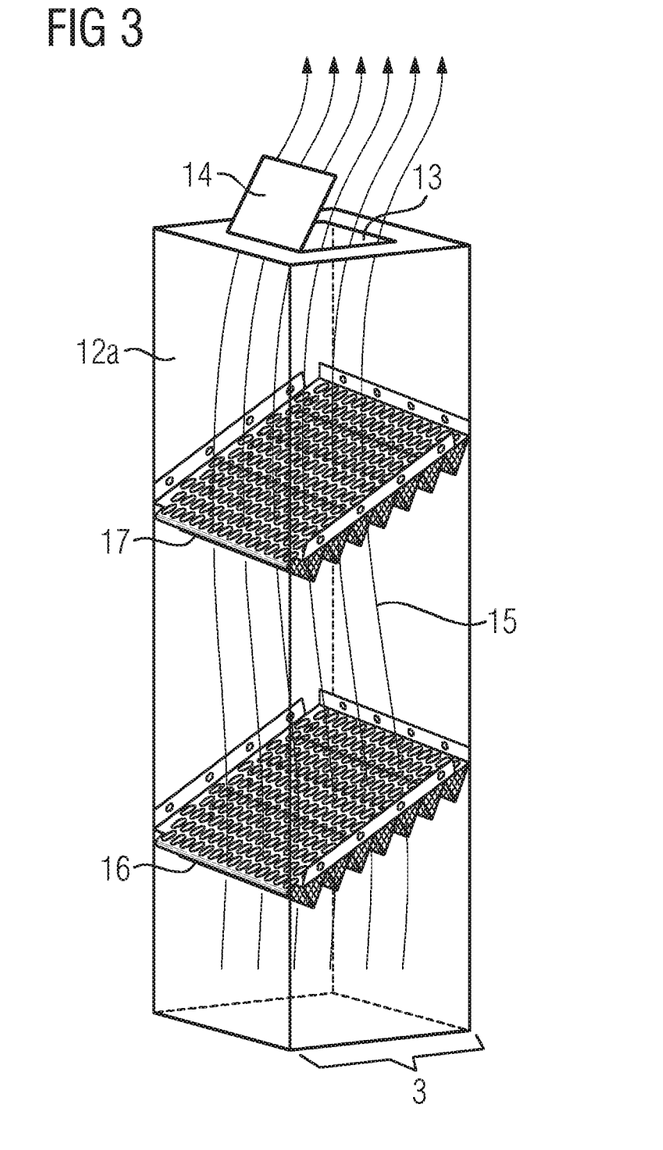
FIG. 3 shows a first installation situation of a diffuser, as known from FIGS. 1 and 2.

FIG. 3 shows a schematic illustration of the first switchgear cabinet 3. Schematically shown is the position of the fluid stream 25, which, substantially running in a vertical direction, passes through the first diffuser 16 and the second diffuser 17 of the pressure relief channel 12a of the first switchgear cabinet 3. Due to a pressure difference, the flap 14 is open, and so the pressure relief opening 13 is opened up and the fluid stream, proceeding from for example faulty cables 7 (not illustrated in FIG. 3), exits into the surroundings of the first switchgear cabinet 3 after passing the first and second diffusers 16, 17. Here, the flap 14 directs the fluid stream 15 away after the latter exits the pressure relief channel 12a of the first switchgear cabinet 3.

Figure 4:
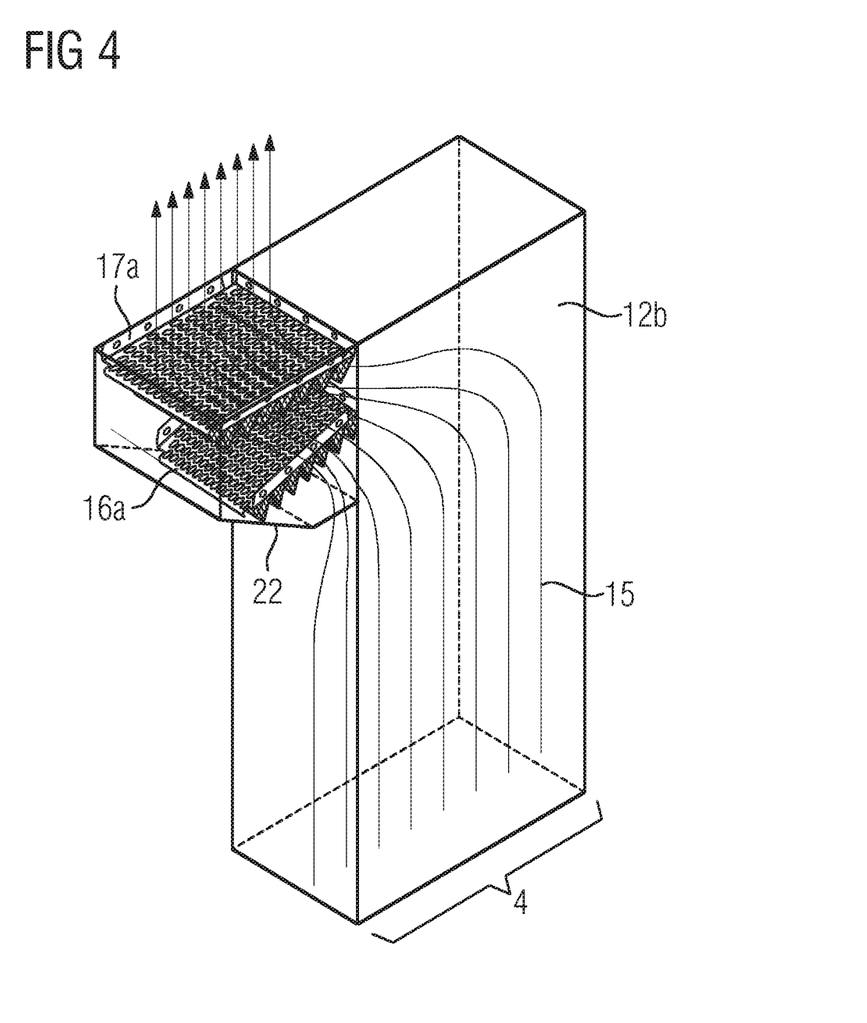
FIG. 4 shows a second installation situation of a diffuser, as known from FIGS. 1 and 2.

FIG. 4 schematically shows the second switchgear cabinet 4, in which a fault occurs in the region of the cables 7 (not illustrated in FIG. 4) and leads for example to an electric arc phenomenon and, as a consequence, to an expansion of gas and particles. From the cables 7, the corresponding fluid stream 15 is conducted away firstly in a vertical direction, so as to be subsequently introduced into the diverting knee 22 in a manner passing through the passage opening. Within the diverting knee 22, the first diffuser 16a of the pressure relief channel 12b of the second switchgear cabinet 4 assists the diversion of the fluid stream 15, whereupon the second diffuser 17a is passed through and, after passing-through of the second diffuser 17a, the fluid stream exits the pressure relief channel 12b of the second switchgear cabinet 4 substantially in a vertical direction.

Comparison of FIGS. 3 and 4 shows that the diffusers 16, 17 of the pressure relief channel 12a of the first switchgear cabinet 3 are oriented with the respective base plate 18 substantially transverse to the fluid stream 15, albeit in this case tilted. Here, the inclined position of the base plate 18 is selected in such a way that a lectern surface of the sawtooth embossment of the meshwork 19 is oriented almost parallel to the direction of passage of the fluid stream 15. This results in the formation of a first group of second openings 25 that is oriented substantially transversely to the direction of passage of the fluid stream, and a second group of second openings that is oriented substantially parallel to the direction of passage of the fluid stream 15.

By contrast thereto, in the arrangement of the first and second diffusers 16a, 17a in the pressure relief channel 12b of the second switchgear cabinet 4, it is provided that the base plates 18 are each passed through substantially perpendicularly by the fluid stream 15. Consequently, for a symmetrical configuration of the sawtooth and the thus resulting lectern surfaces, an almost identical arrangement of the second openings 25, in each case situated in the lectern surfaces, with respect to the direction of passage of the fluid stream 15 is provided.

The invention claimed is:
1. A switchgear cabinet, comprising:
a pressure relief channel for discharging a fluid stream;
a diffuser disposed in said pressure relief channel, said diffuser having a mechanically stabilizing base plate formed with multiple first openings that are covered by a meshwork having multiple second openings;
said meshwork being embossed with a sawtooth embossment having alternately repeating declined and inclined embossment sections across the base plate;
said second openings including a first group of the second openings arranged on respective declined embossment sections that are arranged substantially transversely to a flow direction through said diffuser and a second group of the second openings arranged on respective inclined embossment sections that are arranged substantially parallel to the flow direction through said diffuser.

2. The switchgear cabinet according to claim 1, wherein said second openings are disposed in front of said first openings in a flow direction through said diffuser.

3. The switchgear cabinet according to claim 1, wherein said meshwork is formed so as to delimit at least one cavity under said base plate.

4. The switchgear cabinet according to claim 1, wherein said base plate is arranged inclined to the flow direction through said diffuser.

5. The switchgear cabinet according to claim 1, wherein the diffuser is arranged in a diverting knee so as to assist a change in direction of the fluid stream.

6. The switchgear cabinet according to claim 1, comprising an encapsulated housing and a switchgear housing forming said pressure relief channel, and wherein said diffuser is arranged in a section of said pressure relief channel forming an oriel attached to said encapsulated housing.

7. The switchgear cabinet according to claim 1, wherein said pressure relief channel has a pressure relief opening configured to direct the fluid stream into a vertical direction.

* * * * *